(12) United States Patent
Wastijn et al.

(10) Patent No.: US 7,001,449 B2
(45) Date of Patent: Feb. 21, 2006

(54) DIESEL EXHAUST FILTER SYSTEM WITH ELECTRICAL REGENERATION

(75) Inventors: Koen Wastijn, Deerlijk (BE); Willy Marrecau, Rome, GA (US); Geert Devooght, Koekelare (BE)

(73) Assignee: N.V. Bekaert S.A., Zwevegem (BE)

( * ) Notice: Subject to any disclaimer, the term of this patent is extended or adjusted under 35 U.S.C. 154(b) by 209 days.

(21) Appl. No.: 10/466,550

(22) PCT Filed: Jan. 31, 2002

(86) PCT No.: PCT/EP02/01157

§ 371 (c)(1),
(2), (4) Date: Sep. 4, 2003

(87) PCT Pub. No.: WO02/063145

PCT Pub. Date: Aug. 15, 2002

(65) Prior Publication Data

US 2004/0040268 A1    Mar. 4, 2004

Related U.S. Application Data

(60) Provisional application No. 60/265,907, filed on Feb. 5, 2001.

(51) Int. Cl.
*B01D 46/00* (2006.01)
*B01D 39/20* (2006.01)

(52) U.S. Cl. ............... 95/273; 95/278; 55/282.2; 55/282.3; 55/385.3; 55/482; 55/483; 55/484; 55/487; 55/502; 55/510; 55/521; 55/523; 55/525; 55/527; 55/DIG. 5; 55/DIG. 10; 55/DIG. 30; 60/311; 210/493.2; 210/493.5; 210/494.2

(58) Field of Classification Search ............... 55/282.2, 55/282.3, 385.3, 482, 483, 484, 486, 487, 55/510, 521, 523, 524, 525, 527, 502, DIG. 5, 55/DIG. 10, DIG. 30; 60/311; 210/483, 210/493.1, 493.2, 493.5, 494.2, 496; 95/273, 95/278

See application file for complete search history.

(56) References Cited

U.S. PATENT DOCUMENTS

| | | | |
|---|---|---|---|
| 3,857,688 A * | 12/1974 | Wisnewski ............... 55/502 |
| 4,687,579 A   | 8/1987  | Bergman |
| 5,395,039 A * | 3/1995  | Koehler et al. ............ 210/496 |
| 5,405,422 A * | 4/1995  | Ueda et al. ............... 55/282.3 |
| 5,709,722 A   | 1/1998  | Nagai et al. |
| 5,733,452 A * | 3/1998  | Whitlock ............... 55/510 |
| 5,800,790 A   | 9/1998  | Imamura et al. |
| 6,096,212 A * | 8/2000  | Quick et al. ............... 210/496 |
| 6,572,682 B1 * | 6/2003 | Peter et al. ............... 55/282.2 |

(Continued)

FOREIGN PATENT DOCUMENTS

WO    WO 00/00721    * 1/2000

(Continued)

*Primary Examiner*—Jason M. Geene
(74) *Attorney, Agent, or Firm*—Foley & Lardner LLP

(57) ABSTRACT

A filter element comprises a pleated metal fiber fleece which is pleated according to pleating lines, providing an edge with pleat openings to be closed to make gas flowing through the metal fiber fleece. The filter element comprises at least two flanks, each of these flanks comprises a ceramic plate. The metal fiber fleece is mounted between the ceramic plates of both flanks, while flanks exercising a clamping force on the edges of the metal fiber fleece in a direction essentially parallel to the pleating lines, meanwhile closing the pleat openings.

77 Claims, 6 Drawing Sheets

U.S. PATENT DOCUMENTS

2003/0196419 A1 * 10/2003 Peter et al. ............... 55/282.3
2004/0050022 A1    3/2004 Marrecau et al.
2004/0050023 A1    3/2004 Wastijn et al.
2004/0131511 A1    7/2004 Marrecau et al.

FOREIGN PATENT DOCUMENTS

WO    WO 01/00971 A1    1/2001
WO    WO 02/057000 A1   7/2002

* cited by examiner

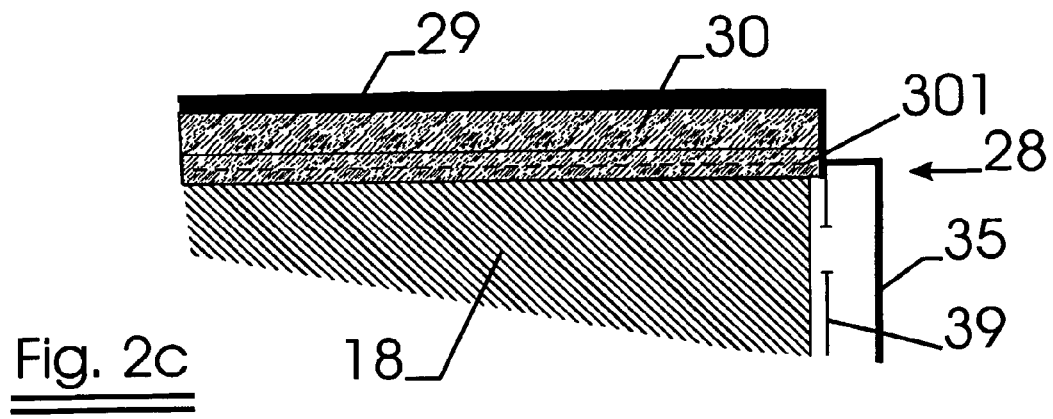
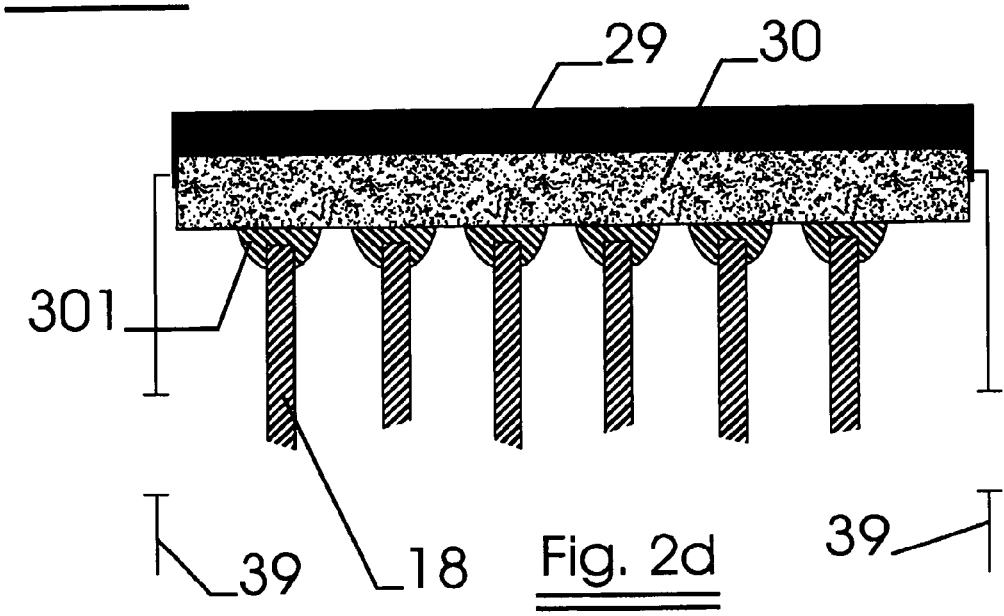
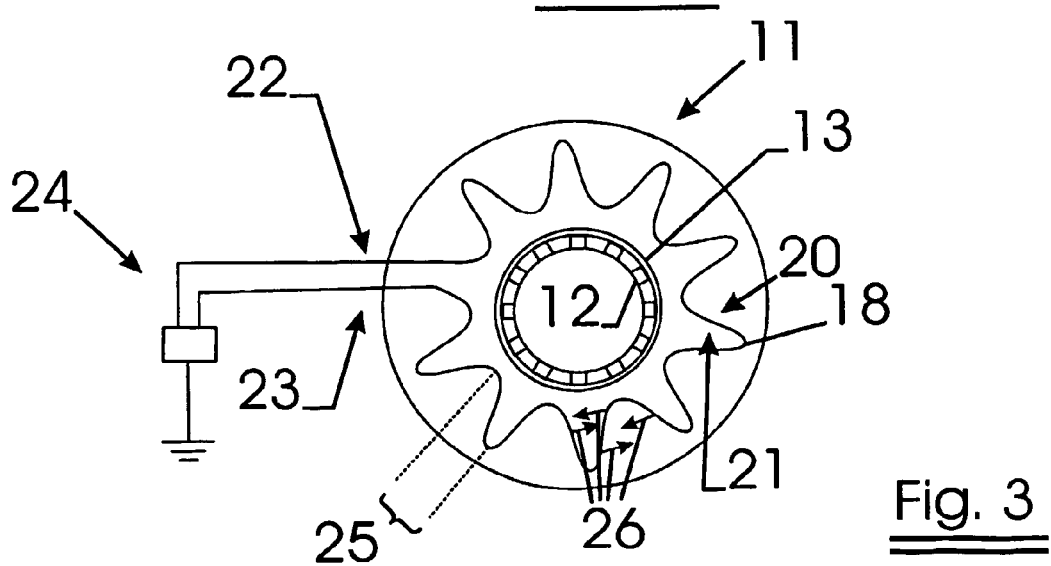

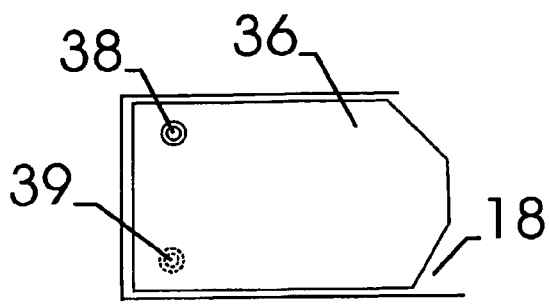
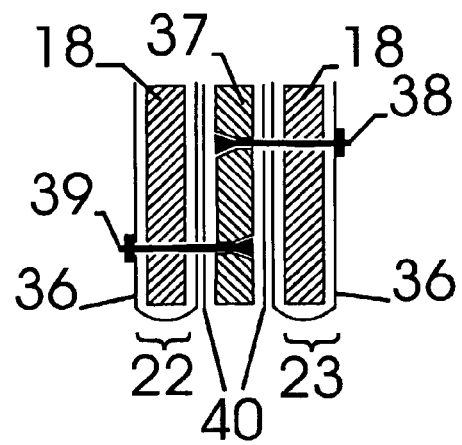
Fig. 4
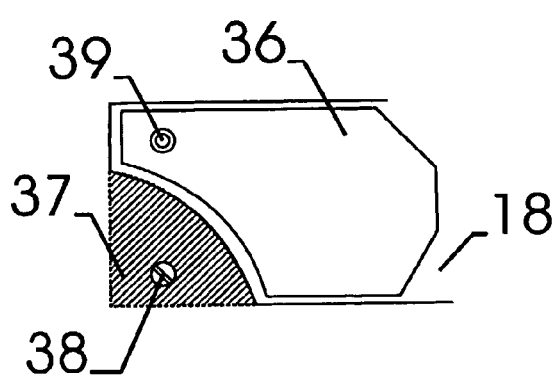
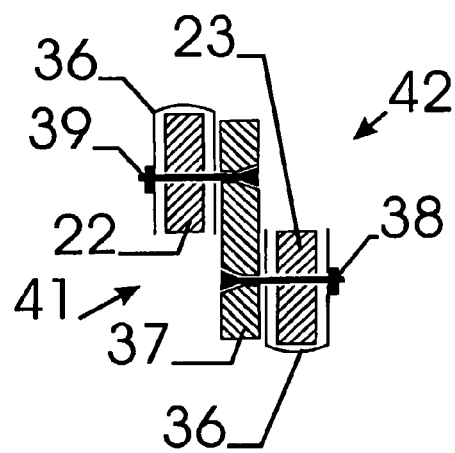
Fig. 5
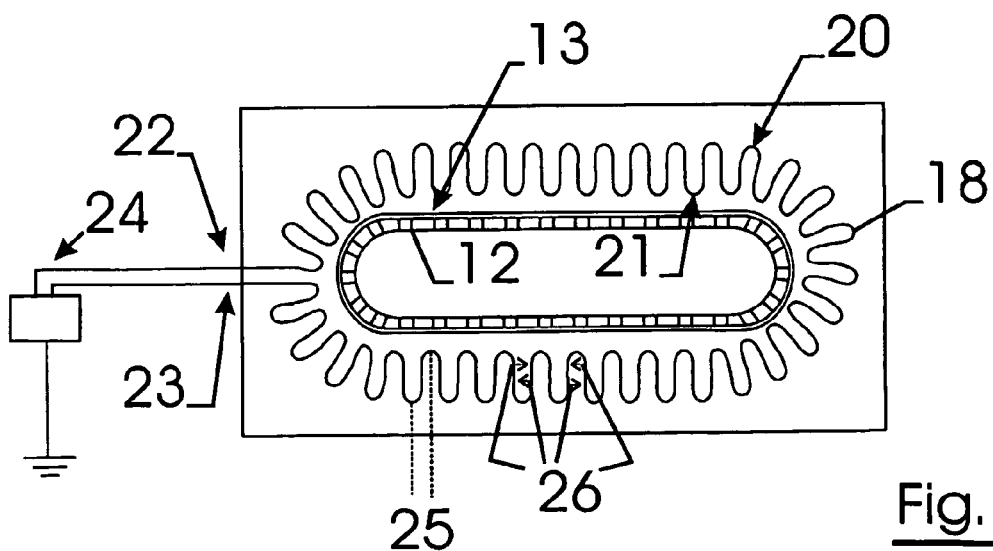
Fig. 6

DIESEL EXHAUST FILTER SYSTEM WITH ELECTRICAL REGENERATION

FIELD OF THE INVENTION

The present invention relates to filter elements, which may be regenerated electrically. More specific, the invention relates to filter elements for filtering diesel exhaust gasses.

BACKGROUND OF THE INVENTION

Diesel soot particulate traps comprising pleated metal fiber fleece are known, e.g. from U.S. Pat. No. 5,709,722.

Diesel soot particulate traps, which can be regenerated via electrical heating of the filter element itself, are known, e.g. from U.S. Pat. No. 5,800,790.

The presently known filter elements, suitable for electrical regeneration, have the disadvantage that most of the thermal energy, obtained by Joule effects out of electrical energy and used to heat the filter element, is lost due to thermal losses.

SUMMARY OF THE INVENTION

It was found that the losses of thermal energy is caused by 3 effects:
1. The filter medium, generating the thermal energy via Joule effects, looses thermal energy via radiation, e.g. towards the filter housing.
2. Thermal energy is lost via convection, heating the gasses which pass through the filter medium during regeneration. This effect is much larger when the strip is regenerated in stream.
3. Thermal energy is lost due to thermal conduction. E.g. when the filter medium is welded to the housing, a lot of thermal energy is transferred from the filter medium to the housing via this contact. The housing is needlessly heated by this thermal energy conducting.

It is an object of the invention to provide a filter element, to be regenerated electrically, which has a reduced thermal energy loss. Further, it is an object of the present invention to improve the contact between filter medium, being electrically regeneratable, and the housing of the filter element.

It is also an object of the invention to provide a filter unit, comprising at least two but possibly more than two filter elements, each filter element being regeneratable individually. Such a filter unit as subject of the invention may be used in a diesel exhaust filter pack for stationary diesel engines of for diesel engines, used in vehicles such as boats, trains or other motor vehicle.

Filter pack is to be understood as a filter system, which is installed or used in a gas stream. It comprises a gas inlet, a gas outlet, and at least one filter unit, installed between inlet and outlet.

A filter element as subject of the invention comprises a pleated metal fiber fleece. This metal fiber fleece, preferably sintered, is pleated according to pleating lines, so providing an edge with pleat openings. The gas, to be filtered, has to flow from one side of the fleece (inflow side) to the other side of the fleece (outflow side), passing through the fleece. Appropriate pleat openings have to be closed in order to force the gas flow through the metal fiber fleece, so preventing bypasses from gas from the inflow side to the outflow side, without passing through the metal fiber fleece.

A filter element according to the invention further comprises a filter element housing, which comprises at least two flanks. According to the present invention, at least one side of each flank is provided out of thermally and electrically insulating material, hereafter referred to as "thermally and electrically insulated side".

According to the invention, the edge of the pleated metal fiber fleece is mounted between the two thermally and electrically insulated sides of the flanks in such a way that the edge makes contact with these thermal and electrically insulated sides of the flanks.

According to the present invention, each flank comprises a ceramic plate, which comes into contact with the edge. The metal fiber fleece is clamped between those two ceramic plates. Both flanks exercise a clamping force on the edge of the metal fiber fleece in a direction essentially parallel to the pleating lines, meanwhile closing the the pleat openings in order to prevent bypasses.

The ceramic plate provides thermal and electrical insulating properties to the flanks. The thickness of the ceramic plates is preferably at least 5 mm, most preferably at least 6 mm, e.g. more than 10 mm.

Preferably these ceramic plates are provided with recesses. The depth of these recesses is preferably larger than 0.5 mm, and may be in the range of 0.5 mm to 2 mm, e.g. 1.58 mm. These recesses are obtainable by providing e.g. a slot in the thermally and electrically insulating ceramic plates. These recesses correspond with the edge, in such a way that they engage closely with the edge when the pleated metal fiber fleece is mounted between the two flanks. The edge of the metal fiber fleece is sunken over a certain depth in the recesses. The part of the edge of the metal fiber fleece, sunken in the recesses is hereafter referred to as "sunken part".

It should be noted that the edge is installed in the recesses in such a way that small movements, e.g. thermal expansions or vibrations, of the pleated metal fiber fleece can be allowed. This freedom of movement is obtained by providing recesses, which are slightly deeper than the height of the sunken part of the edge in the thermally and electrically insulated side.

Less preferably, although possibly according to the present invention, the metal fiber fleece is glued to the ceramic plate using ceramic or high temperature resistant adhesive.

The depth of the recesses and the height of the sunken part of the edge should at least be sufficient to prevent the pleated metal fiber fleece to move along with the gas to be filtered. This phenomena is so called 'blow through'. The depth of the recesses is preferably larger than 0.5 mm, but may be in the range of 0.5 mm to 2 mm. The height of the sunken part is preferably at least 10% less than the depth of the recesses, but also in the range of 0.5 mm to 2 mm.

According to the invention, the flanks comprise a ceramic plates, provided by using ceramic materials, e.g. based on $Al_2O_3$ and or $SiO_2$ or mica to provide this side of the flank. The flank may be provided out of one material, or may comprise different layers, provided by different materials. One understands that, in case of recesses used and in case different layers are used to provide the flanks, the recesses are to be provided in layers, which are thermally and electrically insulating. To protect the ceramic plates against mechanical damages, the ceramic plates may be supported by a metal plate, being present at the other side of the ceramic plate, not contacting the metal fiber fleece. Alternatively, this metal plate may have the shape of a rim, in which the ceramic plate fits.

Filter elements as subject of the invention may further comprise other elements, to form, together with the flanks mentioned above, the filter element housing. These elements may also be thermally and electrically insulated, in order to reduce the thermal energy, lost due to radiation, from the metal fiber fleece to these elements or due to the heating of these elements because of contact between hot gas and housing. E.g. a perforated metal screen or a more permeable thermally insulating fabric may be applied, in order to further reduce the thermal losses due to radiation towards the adjacent filter units of the filter pack wall. In case of a more permeable thermally insulating fabric, preferably, a $SiO_2$-grid woven fabric is used.

In case the metal fiber fleece is glued to the ceramic plates, the ceramic adhesive positions the metal fiber fleece, provides the electrically and thermally insulating properties and offers a good seal between the metal fiber fleece and the stiff material layer. The ductility and the resistance to thermal cycling of the ceramic adhesive layer between flanks and sintered metal fiber layer may be improved by adding metal particles to the ceramic adhesive. Metal short fibers are preferred over metal powder, since the ductility of cured ceramic adhesive is much more superior as compared to ceramic adhesive comprising metal powder. Surprisingly it was found that the electrical insulation properties of such adhesive layer were influenced only slightly, as compared to pure ceramic adhesion.

Short metal fibers preferably comprises fibers with an equivalent diameter "D" between 1 and 150 $\mu$m preferably between 2 and 100. Most preferably the diameter ranges between 2 and 50 $\mu$m or even between 2 and 35 $\mu$m such as 2, 4, 6.5, 8, 12 or 22 $\mu$m. Preferably, but not necessarily, short metal fibers have an L/D-ratio of more than 5, preferably more than 10, wherein L stands for the average length of the short metal fibers.

Preferably, the layer of ceramic adhesive comprises at least 0.5% by weight of short metal fibers, most preferably more than 10% by weight or even more than 20% by weight. Preferably the layer of ceramic adhesive comprises less than 30% by weight of short metal fibers.

According to the invention, the thermally and electrically insulated side of the flanks closes the pleat openings, which are to be closed in order to prevent bypasses from gas to be filtered. These sides fix the metal fiber fleece in its position.

Such filter elements as subject of the invention have several advantages.

The thermal energy loss due to conduction is prevented, since the sides of the flanks, used to close the pleat openings have thermally insulating properties. The metal fiber fleece is only in contact with the filter housing via this side. The pleating of the metal fiber fleece also causes thermal radiation, being radiated from one pleat to the adjacent pleats.

Since electrical current is to be supplied only to the metal fiber fleece, in order to regenerate the fleece, the fleece is electrically insulated from the filter housing at its edge, by the electrically insulated side.

Preferably, the metal fiber fleece is to be resistant to bulging. A sintered and pleated metal fiber fleece has a rather high bulging resistance due to the pleated shape, to provide an edge.

Further, surprisingly it was found that, when a filter element as subject of the invention comprising a thermally and electrically insulating fabric is used, e.g. to filter diesel exhaust gas, loaded with soot particles, the filter element works self-sealing, even after regenerating. This is explained as follows.

The edge of the metal fiber fleece is mounted or pressed between the thermally and electrically insulated sides of the flanks.

Further, surprisingly it was found that a filter using ceramic plates with a recess as subject of the invention seals itself.

The edge of the pleated metal fiber fleece is mounted in a recess in the thermally and electrically insulated side of a flank, being the ceramic plate. Preferably a small void space is provided underneath the edge, to allow small movements. The recess fits that good to the sunken part of edge at the surface to the pleated metal fiber fleece, that under normal circumstances, no gas can bypass the metal fiber fleece via the sides of the edge and these voids. In case there is a small gap between the side of the edge at a sunken part and the slot, soot will be trapped and retained in these gaps. When the filter is regenerated, the soot will not be heated enough in order to incinerate this soot completely. So the bypass of gas through the gaps is hindered after the gaps are filled with soot, due to such bypass. The filter seals itself.

In the scope of the present invention, with metal fiber fleece is meant a fleece, comprising metal fibers, preferably steel fibers. The alloy of metal or steel may be chosen dependant on the temperature range which is to be withstand by the metal fiber fleece. Stainless steel fibers of AISI alloys of the 300- or 400 series, or alloys such as Inconel® are to be preferred. In case high temperatures are to be withstand during regeneration, alloys comprising Fe, Al and Cr are preferred, such as Fecralloy®. The fibers may be obtained by any presently known production method, such as bundle drawing or shaving. Fiber diameters between 1 and 100 $\mu$m are to be used, preferably between 2 and 50 $\mu$m, e.g. between 12 and 35 $\mu$m such as 12, 17 and 22 $\mu$m. preferably the fleece is sintered using appropriate sintering circumstances, according to the alloy used.

Preferably, the metal fibers are obtainable by bundle drawing or coil shaving. The latter is described more in detail in WO97/04152.

Also thickness, weight per $m^2$, pore diameter and other fleece parameters may be chosen, according to the particles which are to be retained and/or the application for which the filter element is to be used.

Preferably, the metal fiber fleece used to provide the filter elements as subject of the invention, comprises different layers of metal fibers. Each fiber layer comprises fibers with a certain equivalent diameter. Best filtering results were obtained when a layer with the coarsest fibers is facing the inflow side of the filter element, whereas a layer of metal fibers with the finest fibers is facing the out-flow side of the filter. An example of such layered metal fiber fleece is a metal fiber fleece comprising a layer of metal fibers with equivalent diameter of 35 $\mu$m, and a layer of metal fibers with an equivalent diameter of 17 $\mu$m. Possibly a layer of metal fibers with equivalent diameter of 22 $\mu$m can be located between these two layers. Porosity of more than 85% is preferred, while the weight per square meter of the fleece is preferably less than 1500 $g/m^2$, e.g. 1450 $g/m^2$.

Equivalent diameter is to be understood as the diameter of a radial cut of an imaginary round fiber, having an identical surface as the radial cut of the fiber under consideration.

According to the present invention, preferably the metal fiber fleece consists of only one strip of filter media comprising metal fibers. Most preferably, this strip is rectangular. However alternatively, the metal fiber fleece may consist of more than one strip of filter media comprising metal fibers which strips are mounted between the two flanks of the filter element as subject of the invention.

Sintered metal fiber fleece has a good resistance against buckling, when put under mechanical load in a direction, parallel to the plane surface of the fleece. To improve the buckling resistance, the fleece may be corrugated using preferably repetitive undulations, with a wavelength preferably less than 5 times the thickness of the fleece. The amplitude of the corrugation is also preferably less than 5 times the thickness of the fleece. The buckling resistance may be improved more than 50% in ambient circumstances. Then the fleece is heated to more than 600° C., the buckling improvement is still more than 30%.

The metal fiber fleece, used to provide a filter element as subject of the invention further comprise at least two but possibly more than two contact bodies, fixed, e.g. clamped on or sintered to the metal fiber fleece. According to the present invention, a contact body is a body to which the electric current is supplied by the electric circuit, in order to regenerate the filter element. This contact body divides in a proper way the electric current over the total surface of the metal fiber fleece. Preferably, these contact bodies are metal foils, e.g. Ni-foil or metal woven meshes, sintered at both ends of the metal fiber fleece.

Special care is to be taken in case the metal fiber fleece is pleated in such a way that both ends of the metal fiber fleece, each of them to be contacting one pole of the electric circuit, are located close to each other. Both contact bodies are to be insulated from each other. This can be done by inserting one or more electrically insulating plates between both contact bodies, e.g. mica plates. Both contact bodies may be connected to this electrically insulating plate using bolts and nuts or alike. Preferably, the contact bodies are applied on the ends in such a way that the contact bodies extend from the metal fiber fleece in the off-stream direction of the filter element.

Filter elements as subjects of the invention are used to provide filter units. Several filter elements may be combined, e.g. stacked one on top of the other. To avoid thermal losses, the different filter elements are separated from each other by a thermally insulating layer, e.g. a thermally insulating and thermal resistant layer of textile, e.g. a woven $SiO_2$-fabric.

Filter elements as subject of the invention may be used to filter hot gases, such an exhaust gases from diesel internal combustion engines. Several filter elements or filter units comprising filter elements as subject of the invention may be used in parallel, e.g. to be able to regenerate at least one filter element, through which no gas flows, so reducing convection heat losses, while the other filter elements continue to filter the gas stream. They may be mounted in series connection, to filter the gas stream in different steps, e.g. for different particle sizes.

Each filter element can be regenerated individually, preferably one after the other. The filter element may be regenerated inline, while gas continues to flow through the filter element, or off-line, while gas is partially or fully prevented to flow through the filter element.

BRIEF DESCRIPTION OF THE DRAWINGS

The invention will now be described into more detail with reference to the accompanying drawings wherein FIG. 2a and FIG. 2c are schematically an enlarged view of part AA' of the filter unit of FIG. 1, whereas FIG. 2b and FIG. 2d are schematically a view according to the plane CC' of the filter unit of FIG. 1

FIG. 3 shows schematically a section according to the plane BB' of the filter unit of FIG. 1.

FIG. 4 shows schematically a side view of the contact bodies from a filter element as subject of the invention.

FIG. 5 shows schematically a view of alternative contact bodies from a filter element as subject of the invention.

FIG. 6, FIG. 7 and FIG. 8 show schematically a section according to the plane BB' of an alternative embodiment of a filter unit as subject of the invention.

DESCRIPTION OF THE PREFERRED EMBODIMENTS OF THE INVENTION

Preferred filter units as subject of the invention is shown in FIGS. 1, 2a, 2b, 2c, 2d and 3.

Figure 1:
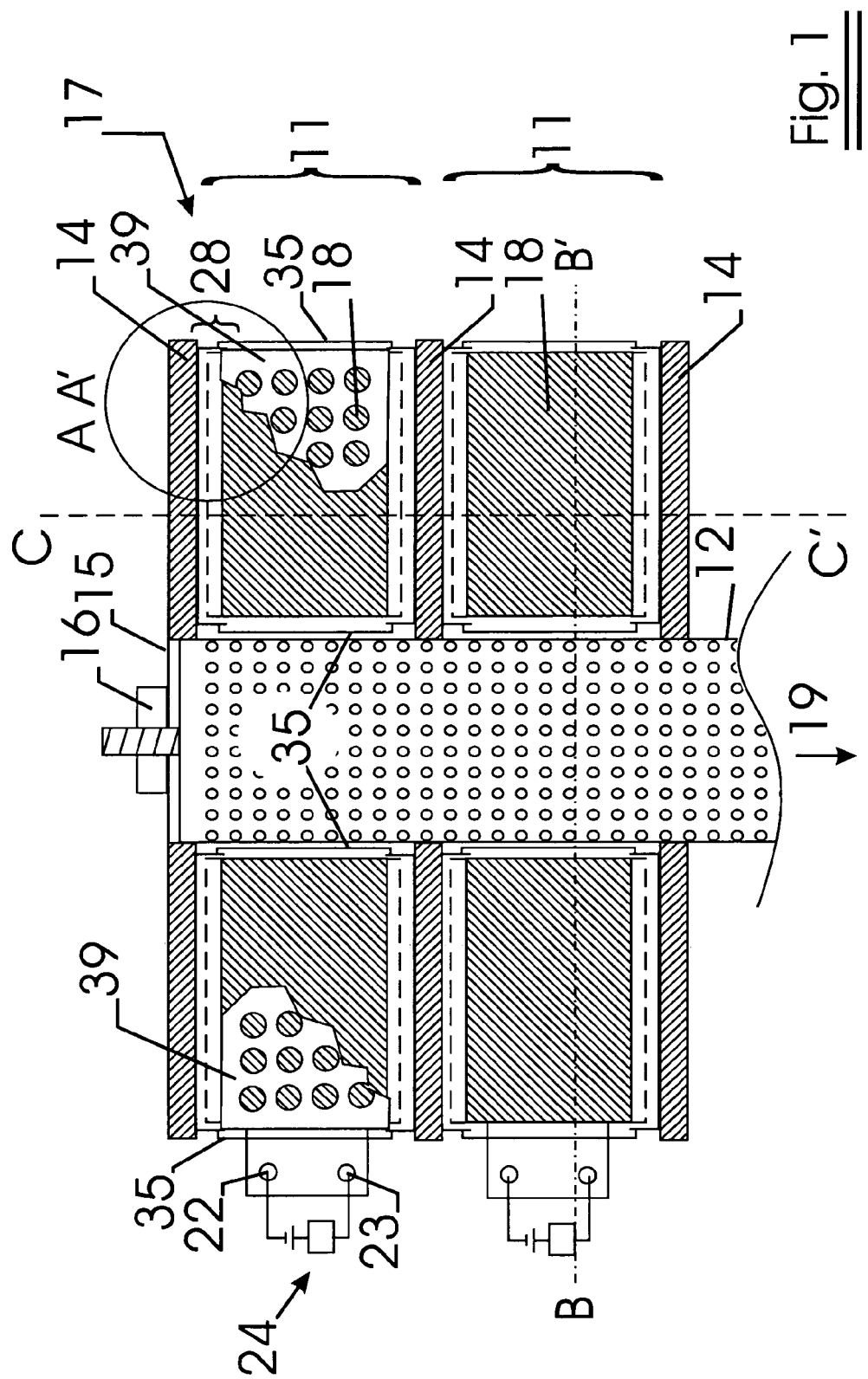
FIG. 1 shows schematically a general view of a filter unit as subject of the invention

The filter unit comprises a number of fitter elements 11, which are stacked one on top of the other. They all have a ring-like shape. A perforated metal tube 12 is positioned inside the inner opening 13 of the filter element. Between each filter element, a disc-like $SiO_2$ felt material 14 is positioned to thermally insulate the different filter elements from each other. At both ends of the filter unit, a metal plate 15 is fixed against the upper and lower filter element e.g. as shown in FIG. 1 by means of a screw 16, which pushes the plate towards the filter element. Between this plate 15 and the upper or lower filter element, another disc-like $SiO_2$ felt material 14 is positioned.

When this filter unit is used, preferably the gas to be filtered flows in from the outer side of the filter elements (indicated with arrow 17), through the filter medium 18 through the perforations of the metal tube 12, to the further exhaust system as indicated with arrow 19.

Taking each filter element of the present embodiment into consideration, a metal fiber fleece is used as filter medium 18. The 'dirty' gas flows in via the inflow side 20, through the metal fiber fleece, via the outflow side 21 of the metal fiber fleece to the exhaust system. The metal fiber fleece is connected via two contact bodies 22 and 23 to an electric circuit 24, providing electrical current to the metal fiber fleece in order to regenerate the dirt, e.g. soot, trapped in and on the filter medium. The metal fiber fleece is preferably pleated in such a way that the thermal radiation heat, generated by the pleats 25 during regeneration, radiates to the adjacent pleats, as indicated by arrows 26. An important reduction of electrical power is obtained using this radiation heat to propagate and support the combustion of the filtered particles The set-up of a preferred embodiments of the filter element is shown in FIGS. 2a and 2c or in FIGS. 2b and 2d.

Figure 2A:
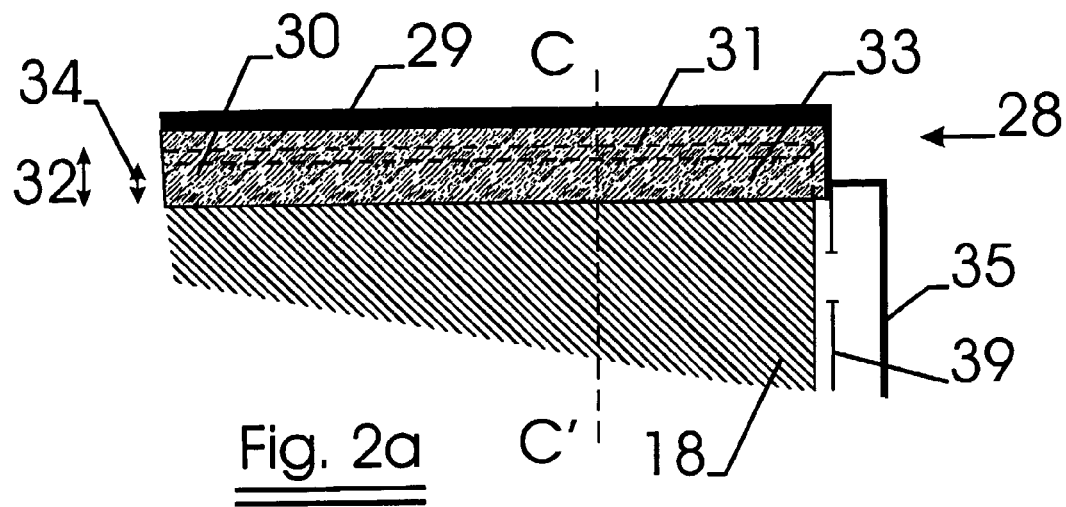
Figure 2B:
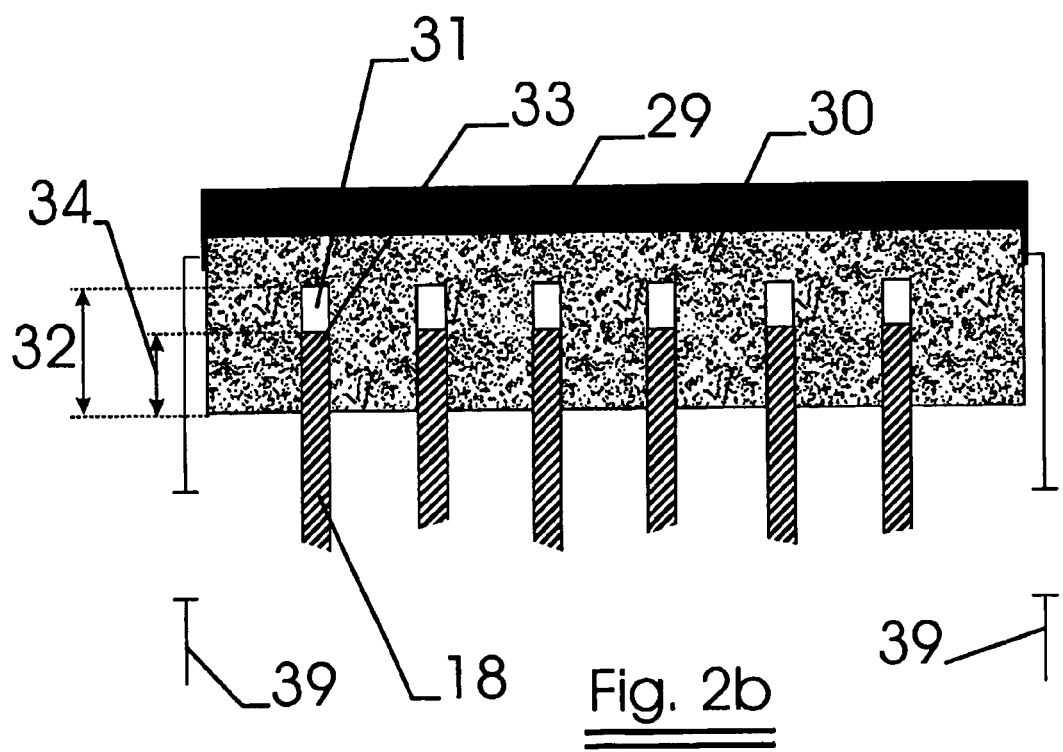

A detail AA' of a fist embodiment is shown in FIG. 2a. A section according to the plane CC' of this embodiment is shown schematically in FIG. 2b. A flank 28 of the filter element comprises a metal rim 29, in which a ceramic plate 30 is provided. This ceramic plate is based on $Al_2O_3$-ceramic material or $SiO_2$-material and has a thickness of approximately 6 mm. The ceramic plate 30 is provided with a recess 31 having a depth 32 of 2 mm. The edge of metal fiber fleece 18 is sunken into the recess 31, so providing a sunken part 33 to the edge of metal fiber fleece 18 having a height 34 of approximately 1.5 mm.

A detail AA' of a second embodiment is shown in FIG. 2c. a section according to the plane CC' of this embodiment is shown schematically in FIG. 2d.

A flank 28 of the filter element comprises a metal rim 29, in which a ceramic plate 30 is provided. This ceramic plate is based on Al2O3-ceramic material or $SiO_2$-material and has a thickness of approximately 6 mm. At the inner side of the ceramic plate 30, which is to make contact with the metal fiber fleece 18, a ceramic glue 301 is provided. The edge of metal fiber fleece 18 is sunken into the glue 301. This relatively thick layer of ceramic adhesive 301 based on ZrO2-MgO compound, comprises more than 10% of weight of short metal fibers, preferably being stainless steel fibers having an equivalent diameter of 22 μm.

To improve the resistance to the mechanical tension, due to the fixation of the different elements on top of each other by screw 16, several studs 35 may be welded to the upper and lower rim of each filter element. As shown in FIG. 1 and FIGS. 2a, 2b, 2c and 2d, around the filter element 11, a perforated metal plate 39 may be present (as only shown partially in the Figures for the sake of clarity).

Turning now to the contact bodies 22 and 23 of the preferred embodiment as shown in FIG. 4 and FIG. 5, a fine Ni-sheet 36 was sintered to the ends of the metal fiber fleece. Both contact bodies were brought together and fixed to an insulating plate 37, e.g. a mica-plate by means of two bolts 38 and 39. In order to avoid electrical contact between contact body 22 and bolt 38, and between contact body 23 and bolt 39, two mica sheets 40 were inserted between the insulating plate 37 and the contact bodies 22 and 23.

An alternative set-up is shown in FIG. 5. An identical set-up as in FIG. 4 is used, but the contact body 22 is shaped in such a way that no material of this contact body 22 is present at behind bolt 38, fixing the contact body 23 to the insulating plate 37. Identically, the contact body 23 is shaped in such a way that no material of this contact body 23 is present at behind bolt 39, fixing the contact body 22 to the insulating plate 37. Using such contact bodies, the use of two mica plates 40 may be avoided, which may simplify the construction of the filter element.

An alternative cut according to BB' is shown in FIG. 6. The perforated tube in this embodiment has an elliptic section. Also here, the metal fiber fleece is pleated according to pleating lines, which enables radiation from one pleat to another during regeneration.

Figure 7:
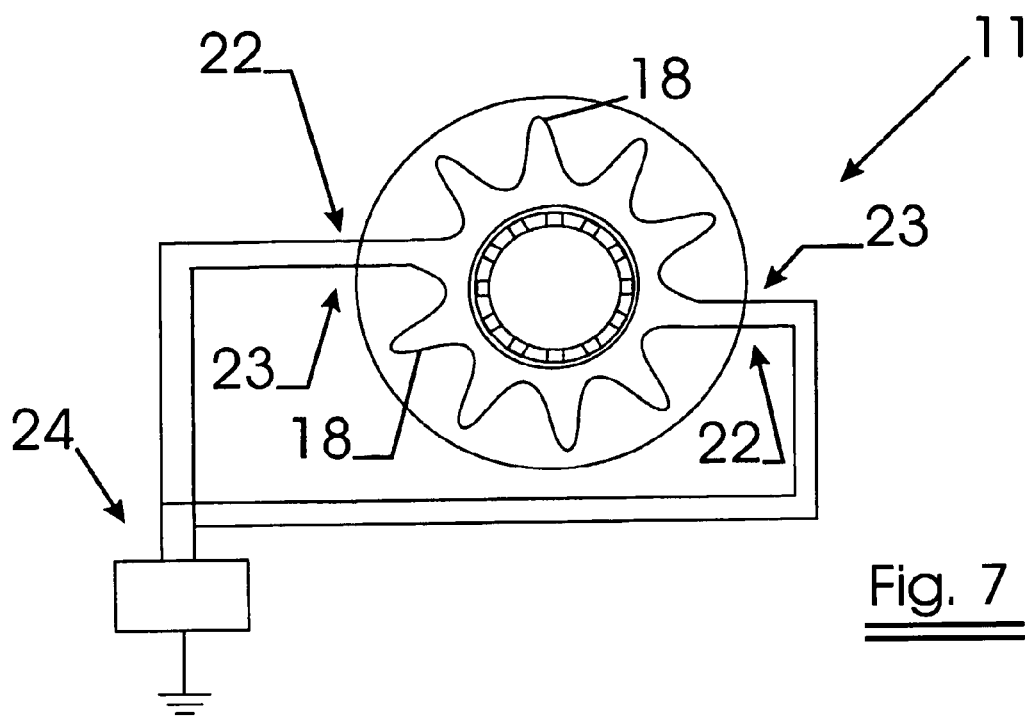

An other alternative cross section of a filter element as subject of the invention is shown in FIG. 7. The filter element in this embodiment comprises two metal fiber fleece strips, which together form the whole filter media of the filter element. Both metal fiber fleece strips have two contact bodies (22 and 23), at one end each, which are connected to an appropriate electric circuit 24.

Figure 8:
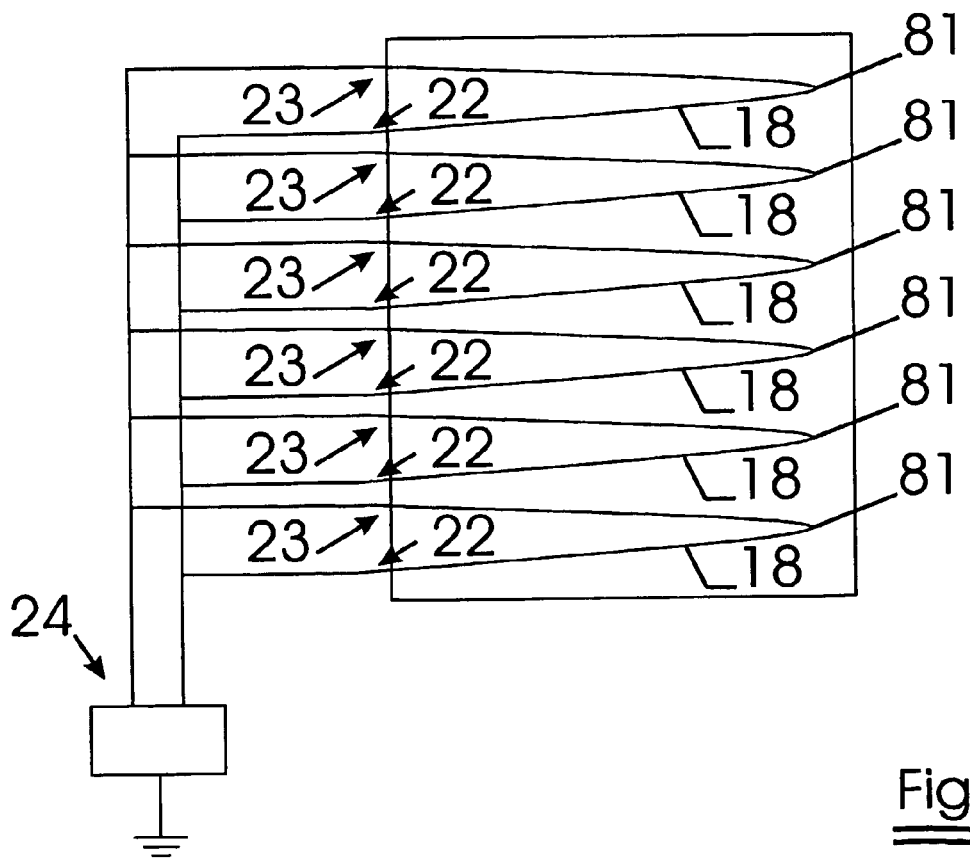

Another alternative cross section of a filter element as subject of the invention is shown in FIG. 8. The filter element comprises a set of metal fiber fleece strips, each being pleated over one pleating line 81. All strips are mounted side by side. Each metal fiber fleece strip has two contact bodies (22 and 23), one at each end of the strip. The contact bodies are lined up and connected to an appropriate electric circuit 24.

Figure 9:
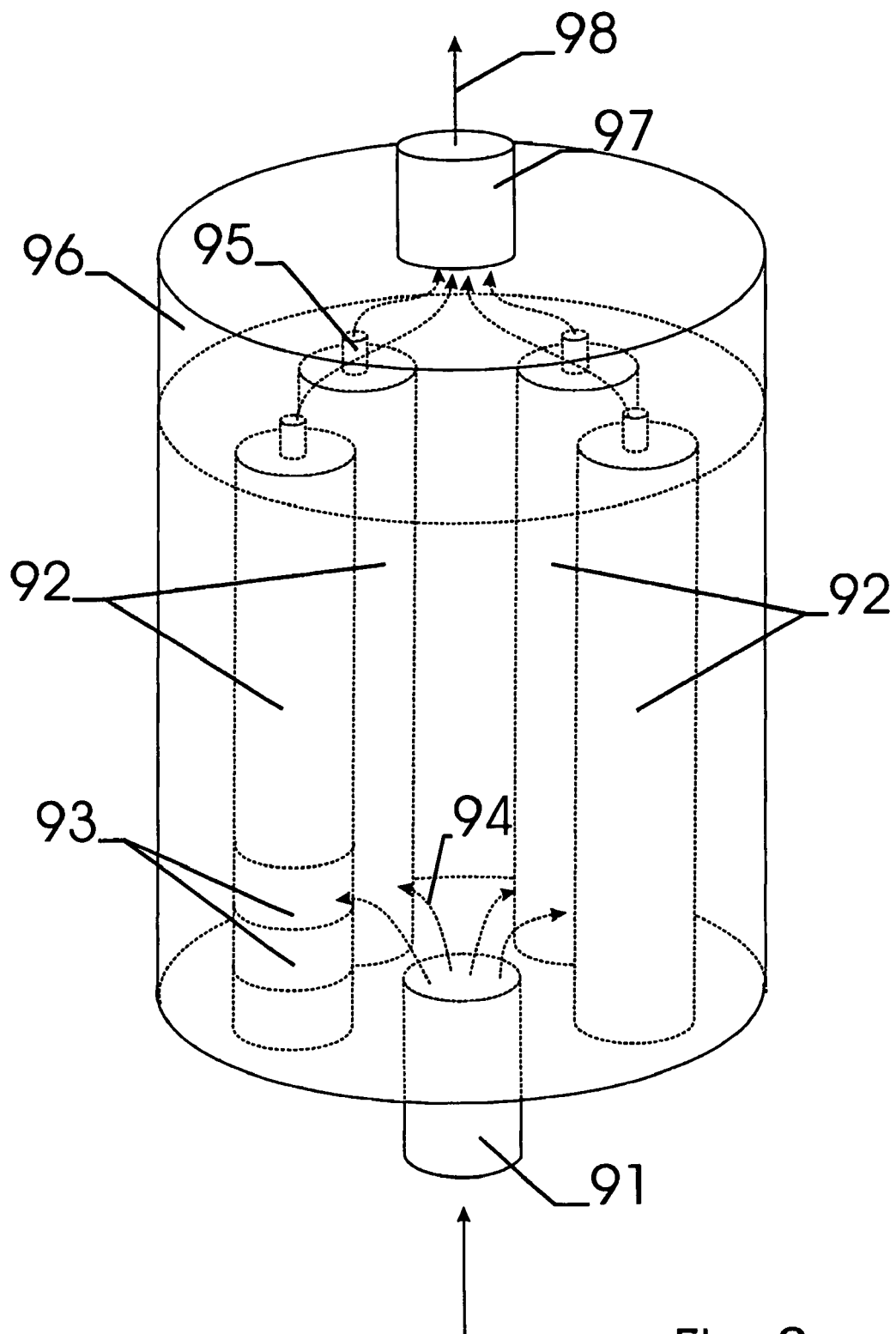
FIG. 9 shows a diesel exhaust filter system in a muffler-like shape, comprising different filter units as subject of the invention.

As shown in FIG. 9, gas to be filtered may enter into a muffler system, via inlet 91. Several filter units 92, each comprising several filter elements 93 are present in the muffler-like system. The gas to be filtered goes, as indicated with arrow 94, through the filter media of each filter element and leaves the filter unit 92 via the perforated tube 95 in a collecting chamber 96. Via an outlet 97, the filtered exhaust gas flows further through the exhaust system as indicated with arrow 98.

As filter medium, a sintered metal fiber fleece comprising three layers of stainless steel fibers is used. A first layer comprises 600 g/m$^2$ of Fecralloy® fibers with equivalent diameter of 17 μm. A second layer of Fecralloy® fibers is applied on top of the first layer. This layer comprises 250 g/m$^2$ of fibers with equivalent diameter of 22 μm. A third layer of Fecralloy® fibers is applied on top of the second layer, having fibers with equivalent diameter of 35 μm. This third layer comprises 600 g/m$^2$ fibers.

A soot retention of 91% was obtained, using a stainless steel fleece, having a porosity of 85%.

The length of the metal fiber fleece in the above described embodiments is preferably 1200 mm, while the height of the metal fiber fleece strip is preferably between 30 and 35 mm, e.g. 33.75 mm.

The soot was so-called depth filtered. This is to be understood as the fact that soot particles were trapped through the whole depth of the filter.

Only 1 minute per element was needed to regenerate the filter unit, while consuming only 750 W to 1500 W The pressure drop over the filter element was set to 100 mbar before regeneration.

What is claimed is:

1. A filter element comprising a pleated metal fiber fleece pleated according to pleating lines, providing an edge with pleat openings to be closed to make gas flow through said metal fiber fleece, said filter element comprising at least two flanks wherein each of said flanks comprises a ceramic plate, said metal fiber fleece is mounted between the ceramic plates of both flanks, said flanks exercising a clamping force on edges of said metal fiber fleece in a direction essentially parallel to said pleating lines, said flanks closing said pleat openings, each of said ceramic plates being provided with a recess, said edges of said metal fiber fleece being sunken in said recesses, said edge being sunken over a height, said height being at least 10% less than the depth of said recesses.

2. A filter element comprising a pleated metal fiber fleece pleated according to pleating lines, providing an edge with pleat openings to be closed to make gas flow through said metal fiber fleece, said filter element comprising at least two flanks wherein each of said flanks comprises a ceramic plate, said metal fiber fleece is mounted between the ceramic plates of both flanks, said flanks exercising a clamping force on edges of said metal fiber fleece in a direction essentially parallel to said pleating lines, said flanks closing said pleat openings, each of said ceramic plates being provided with a recess, said edges of said metal fiber fleece being sunken in said recesses, a depth of said recesses being more than 0.5 mm, said depth of said recesses being less than 2 mm.

3. A filter element comprising a pleated metal fiber fleece pleated according to pleating lines, providing an edge with pleat openings to be closed to make gas flow through said metal fiber fleece, said filter element comprising at least two flanks wherein each of said flanks comprises a ceramic plate, said metal fiber fleece is mounted between the ceramic plates of both flanks, said flanks exercising a clamping force on edges of said metal fiber fleece in a direction essentially parallel to said pleating lines, said flanks closing said pleat openings, said edges of said metal fiber fleece being glued to said ceramic plates of said flanks using ceramic glue, said ceramic glue comprising short metal fibers.

4. A filter element comprising a pleated metal fiber fleece pleated according to pleating lines, providing an edge with pleat openings to be closed to make gas flow through said metal fiber fleece, said filter element comprising at least two flanks wherein each of said flanks comprises a ceramic plate, said metal fiber fleece is mounted between the ceramic plates of both flanks, said flanks exercising a clamping force on edges of said metal fiber fleece in a direction essentially parallel to said pleating lines, said flanks closing said pleat openings, each of said ceramic plates being provided with a recess, said recess corresponding to one of said edges of said metal fiber fleece, said edge of said metal fiber fleece being sunken in said recess to engage said recess.

5. A filter element as in claim 1, wherein said ceramic plates have a thickness of at least 7 mm.

6. A filter element as in claim 1, wherein said recesses have a depth of more than 0.5 mm, said depth of said recesses being less than 2 mm.

7. A filter element as in claim 1, wherein said edge of said metal fiber fleece is glued to said ceramic plates of said flanks using ceramic glue.

8. A filter element as in claim 7, wherein said ceramic glue comprises short metal fibers.

9. A filter element as in claim 7, wherein said metal fiber fleece consists of stainless steel fibers.

10. A filter element as in claim 9, wherein said metal fiber fleece is corrugated, with a corrugation comprising repetitive undulations having a wavelength of less than 5 times the thickness of said metal fiber fleece.

11. A filter element as in claim 10, wherein said filter element comprises at least two contact bodies, wherein said contact bodies are fixed to said metal fiber fleece.

12. A filter element as in claim 9, wherein said filter element comprises at least two contact bodies, wherein said contact bodies are fixed to said metal fiber fleece.

13. A filter element as in claim 7, wherein said metal fiber fleece is corrugated, with a corrugation comprising repetitive undulations having a wavelength of less than 5 times the thickness of said metal fiber fleece.

14. A filter element as in claim 1, wherein said metal fiber fleece consists of stainless steel fibers.

15. A filter element as in claim 1, wherein said metal fiber fleece is corrugated, with a corrugation comprising repetitive undulations having a wavelength of less than 5 times the thickness of said metal fiber fleece.

16. A filter element as in claim 1, wherein said filter element comprises at least two contact bodies, wherein said contact bodies are fixed to said metal fiber fleece.

17. A filter element as in claim 2, wherein said ceramic plates have a thickness of at least 7 mm.

18. A filter element as in claim 2, wherein said edges of said metal fiber fleece are glued to said ceramic plates of said flanks using ceramic glue.

19. A filter element as in claim 18, wherein said ceramic glue comprises short metal fibers.

20. A filter element as in claim 19, wherein said metal fiber fleece consists of stainless steel fibers.

21. A filter element as in claim 20, wherein said metal fiber fleece is corrugated, with a corrugation comprising repetitive undulations having a wavelength of less than 5 times the thickness of said metal fiber fleece.

22. A filter element as in claim 21, wherein said filter element comprises at least two contact bodies, wherein said contact bodies are fixed to said metal fiber fleece.

23. A filter element as in claim 20, wherein said filter element comprises at least two contact bodies, wherein said contact bodies are fixed to said metal fiber fleece.

24. A filter element as in claim 18, wherein said metal fiber fleece is corrugated, with a corrugation comprising repetitive undulations having a wavelength of less than 5 times the thickness of said metal fiber fleece.

25. A filter element as in claim 2, wherein said metal fiber fleece consists of stainless steel fibers.

26. A filter element as in claim 2, wherein said metal fiber fleece is corrugated, with a corrugation comprising repetitive undulations having a wavelength of less than 5 times the thickness of said metal fiber fleece.

27. A filter element as in claim 2, wherein said filter element comprises at least two contact bodies, said contact bodies are fixed to said metal fiber fleece.

28. A filter element as in claim 3, wherein said ceramic plates have a thickness of at least 7 mm.

29. A filter element as in claim 3, wherein each of said ceramic plates is provided with a recess, wherein said edges of said metal fiber fleece are sunken in said recesses.

30. A filter element as in claim 3, wherein said metal fiber fleece consists of stainless steel fibers.

31. A filter element as in claim 3, wherein said metal fiber fleece is corrugated, with a corrugation comprising repetitive undulations having a wavelength of less than 5 times the thickness of said metal fiber fleece.

32. A filter element as in claim 3, wherein said filter element comprising at least two contact bodies, wherein said contact bodies are fixed to said metal fiber fleece.

33. A filter element as in claim 30, wherein said metal fiber fleece is corrugated, with a corrugation comprising repetitive undulations having a wavelength of less than 5 times the thickness of said metal fiber fleece.

34. A filter element as in claim 30, wherein said filter element comprises at least two contact bodies, wherein said contact bodies are fixed to said metal fiber fleece.

35. A filter element as in claim 34, wherein said metal fiber fleece is corrugated, with a corrugation comprising repetitive undulations having a wavelength of less than 5 times the thickness of said metal fiber fleece.

36. A filter element as in claim 4, wherein said ceramic plates have a thickness of at least 7 mm.

37. A filter element as in claim 4, wherein said edges are sunken over a height, said height being at least 10% less than the depth of said recesses.

38. A filter element as in claim 4, wherein said recesses have a depth of more than 0.5 mm, said depth of said recesses being less than 2 mm.

39. A filter element as in claim 38, wherein said edges are sunken over a height, said height being at least 10% less than the depth of said recesses.

40. A filter element as in claim 4, wherein said edges of said metal fiber fleece are glued to said ceramic plates of said flanks using ceramic glue.

41. A filter element as in claim 40, wherein said ceramic glue comprises short metal fibers.

42. A filter element as in claim 40, wherein said edges are sunken over a height, said height being at least 10% less than the depth of said recesses.

43. A filter element as in claim 40, wherein said recesses have a depth of more than 0.5 mm, said depth of said recesses being less than 2 mm.

44. A filter element as in claim 42, wherein said recesses have a depth of more than 0.5 mm, said depth of said recesses being less than 2 mm.

45. A filter element as in claim 41, wherein said edges are sunken over a height, said height being at least 10% less than the depth of said recesses.

46. A filter element as in claim 41, wherein said recesses have a depth of more than 0.5 mm, said depth of said recesses being less than 2 mm.

47. A filter element as in claim 46, wherein said edges are sunken over a height, said height being at least 10% less than the depth of said recesses.

48. A filter element as in claim 4, wherein said metal fiber fleece consists of stainless steel fibers.

49. A filter element as in claim 36, wherein said metal fiber fleece consists of stainless steel fibers.

50. A filter element as in claim 37, wherein said metal fiber fleece consists of stainless steel fibers.

51. A filter element as in claim 38, wherein said metal fiber fleece consists of stainless steel fibers.

52. A filter element as in claim 39, wherein said metal fiber fleece consists of stainless steel fibers.

53. A filter element as in claim 40, wherein said metal fiber fleece consists of stainless steel fibers.

54. A filter element as in claim 41, wherein said metal fiber fleece consists of stainless steel fibers.

55. A filter element as in claim 42, wherein said metal fiber fleece consists of stainless steel fibers.

56. A filter element as in claim 43, wherein said metal fiber fleece consists of stainless steel fibers.

57. A filter element as in claim 44, wherein said metal fiber fleece consists of stainless steel fibers.

58. A filter element as in claim 45, wherein said metal fiber fleece consists of stainless steel fibers.

59. A filter element as in claim 46, wherein said metal fiber fleece consists of stainless steel fibers.

60. A filter element as in claim 47, wherein said metal fiber fleece consists of stainless steel fibers.

61. A filter element as in claim 4, wherein said metal fiber fleece is corrugated, with a corrugation comprising repetitive undulations having a wavelength of less than 5 times the thickness of said metal fiber fleece.

62. A filter element as in claim 48, wherein said metal fiber fleece is corrugated, with a corrugation comprising repetitive undulations having a wavelength of less than 5 times the thickness of said metal fiber fleece.

63. A filter element as in claim 4, wherein said filter element comprises at least two contact bodies, wherein said contact bodies are fixed to said metal fiber fleece.

64. A filter element as in claim 48, wherein said filter element comprises at least two contact bodies, wherein said contact bodies are fixed to said metal fiber fleece.

65. A filter element as in claim 62, wherein said filter element comprises at least two contact bodies, wherein said contact bodies are fixed to said metal fiber fleece.

66. A filter unit, comprising at least two filter elements as in claim 1, wherein said filter elements are thermally insulated from each other.

67. A filter unit, comprising at least two filter elements as in claim 2, wherein said filter elements are thermally insulated from each other.

68. A filter unit, comprising at least two filter elements as in claim 3, wherein said filter elements are thermally insulated from each other.

69. A filter unit, comprising at least two filter elements as in claim 4, wherein said filter elements are thermally insulated from each other.

70. Use of a filter element for filtering diesel exhaust gas, comprising the steps of
providing a filter element as in claim 1 in an exhaust system for diesel exhaust gas; and
allowing diesel exhaust gas to flow through the metal fiber fleece of the filter element for retention of soot particles out of said diesel exhaust gas.

71. Use of a filter element for filtering diesel exhaust gas, comprising the steps of
providing a filter element as in claim 2 in an exhaust system for diesel exhaust gas; and
allowing diesel exhaust gas to flow through the metal fiber fleece of the filter element for retention of soot particles out of said diesel exhaust gas.

72. Use of a filter element for filtering diesel exhaust gas, comprising the steps of
providing a filter element as in claim 3 in an exhaust system for diesel exhaust gas; and
allowing diesel exhaust gas to flow through the metal fiber fleece of the filter element for retention of soot particles out of said diesel exhaust gas.

73. Use of a filter element for filtering diesel exhaust gas, comprising the steps of
providing a filter element as in claim 4 in an exhaust system for diesel exhaust gas; and
allowing diesel exhaust gas to flow through the metal fiber fleece of the filter element for retention of soot particles out of said diesel exhaust gas.

74. Use of a filter unit for filtering diesel exhaust gas, comprising the steps of
providing a filter unit as in claim 66 in an exhaust system for diesel exhaust gas; and
allowing diesel exhaust gas to flow through the metal fiber fleece of the filter elements for retention of soot particles out of said diesel exhaust gas.

75. Use of a filter unit for filtering diesel exhaust gas, comprising the steps of
providing a filter unit as in claim 67 in an exhaust system for diesel exhaust gas; and
allowing diesel exhaust gas to flow through the metal fiber fleece of the filter elements for retention of soot particles out of said diesel exhaust gas.

76. Use of a filter unit for filtering diesel exhaust gas, comprising the steps of
providing a filter unit as in claim 68 in an exhaust system for diesel exhaust gas; and
allowing diesel exhaust gas to flow through the metal fiber fleece of the filter elements for retention of soot particles out of said diesel exhaust gas.

77. Use of a filter unit for filtering diesel exhaust gas, comprising the steps of
providing a filter unit as in claim 69 in an exhaust system for diesel exhaust gas; and
allowing diesel exhaust gas to flow through the metal fiber fleece of the filter elements for retention of soot particles out of said diesel exhaust gas.

* * * * *